April 21, 1931.  H. D. GEYER  1,801,551
STEERING WHEEL AND SHAFT ASSEMBLY
Filed Feb. 25, 1926
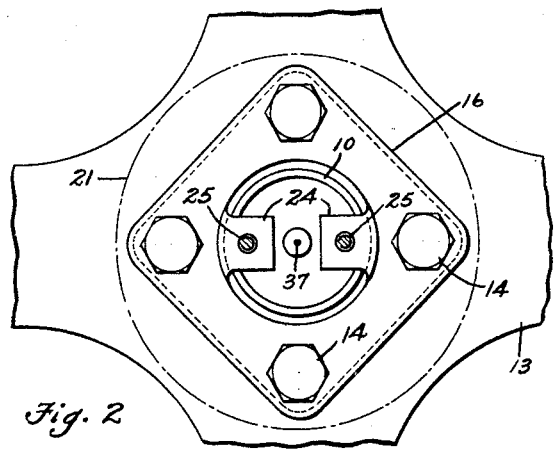
Fig. 2
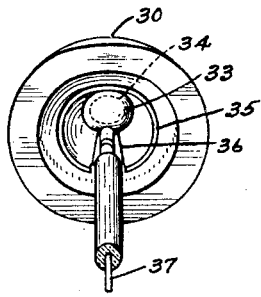
Fig. 3
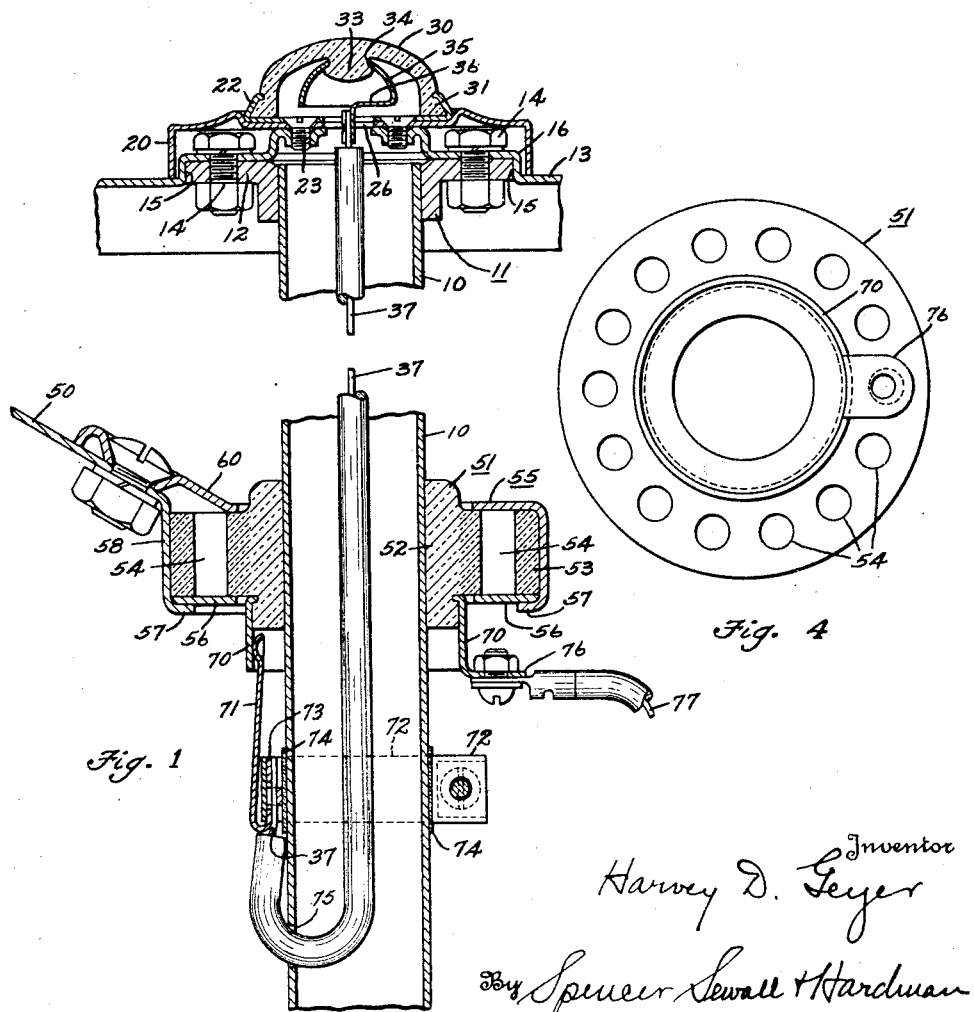
Fig. 4
Fig. 1
Inventor
Harvey D. Geyer
By Spencer Sewall & Hardman
his Attorneys Patented Apr. 21, 1931

1,801,551

UNITED STATES PATENT OFFICE

HARVEY D. GEYER, OF DAYTON, OHIO, ASSIGNOR TO INLAND MANUFACTURING COMPANY, OF DAYTON, OHIO, A CORPORATION OF DELAWARE

STEERING WHEEL AND SHAFT ASSEMBLY

Application filed February 25, 1926. Serial No. 90,671.

This invention relates to a steering wheel and steering shaft assembly particularly such as is ordinarily used in automotive vehicles.

An object of this invention is to provide a very simple, efficient and economical steering shaft and steering wheel assembly.

A more specific object is to provide an improved method of mounting a pressed metal spider upon a tubular steering shaft of such thin metal that a hub cannot be readily keyed or splined thereto.

Another object is to provide an efficient, simple and well-appearing horn switch built in the center of the steering wheel.

Another object is to provide a yieldable bearing for an unhoused steering shaft at the instrument board whereby the yielding of the bearing will prevent any binding of the steering shaft therein in case of slight weaving of the automotive body.

Further objects and advantages of the present invention will be apparent from the following description, reference being had to the accompanying drawings, wherein a preferred form of embodiment of the invention is clearly shown.

In the drawings:

Fig. 1 shows a center line section through portions of the steering shaft together with the central parts of the steering wheel and the bearing at the instrument board.

Fig. 2 is a plan view of the central portion of the steering wheel but with the top cover plate and horn button removed.

Fig. 3 is a perspective view of the rubber horn button showing the method of attaching the live wire and movable contact member thereto.

Fig. 4 is a detail view of the molded rubber bearing and the metal contact ring which is molded in place thereto.

Similar reference characters refer to similar parts throughout the several views of the drawings.

Numeral 10 designates the tubular steering shaft which has fixed to its upper end, preferably by welding, the flanged hub member 11 which has a substantially square flange 12. The steering wheel spider 13 is a pressed metal stamping made up from a single piece of sheet metal, preferably steel. This stamping 13 has a drawn-out, substantially square recess 15 at the center thereof which fits snugly over the square flange 12 and is held down thereupon by the four bolts 14, as clearly shown in Fig. 1. It will be obvious that the cooperation of the square recess 15 with the square flange 12 gives a very strong torque-carrying construction between the thin sheet metal of the spider 13 and the member 11.

The central part of the wheel is covered with a decorative stamped aluminum cover 20 which conceals the heads of bolts 14 and the square-shaped hump 16 due to the drawing out of recess 15. The outline of the circular cover 20 is indicated by the dot-and-dash line 21 in Fig. 2. Concentric with the cover 20 and fitting thereupon is the horn button retaining cup 22. Both the cup 22 and cover 20 are retained in place by means of the two screws 23 which are threaded into the two diametrically opposite sheet metal ears 24 which are cut out and bent up from the sheet metal of the spider 13. These ears 24 have the holes 25 punched therein to give a sufficient thickness of metal for the threads to be tapped therein for the screws 23, as clearly shown in Fig. 1. Preferably the cup 22 and cover 20 are attached together independently of the screws 23 for convenience in assembling the parts upon the wheel. This attachment may be easily done by two small sheet metal ears (not shown) bent up from one of these members and engaging the other.

The central horn button 30 is of soft rubber which may be easily depressed at its center. The button 30 is provided with a suitable bead 31 which fits snugly within the retaining cup 22 which thus holds the button in place, but permits its ready removal simply by flexing the button out of shape sufficiently to get the bead 31 out of the cup 22. Horn button 30 has a depending soft rubber lug 33 interior thereof which is forced into a central aperture 34 in the movable electric switch member 35, and thereby secures the member 35 to the center of the horn button 30. This switch member 35 is preferably cupped up from sheet metal and has an integral ear 36 which serves as a connector for the attachment of the insulated wire 37 thereto. This ear 36 is preferably bent so that the wire 37 extends downward from the center of the horn button 30, as clearly shown in Fig. 1. It will now be seen that the rubber button 30 serves as an insulated mounting for the switch member 35 and supports the upper end of the live wire 37 in such manner that it hangs at the center of tube 10 and requires no other support or insulation. When the operator depresses button 30, the switch member 35 contacts with the upper surface of the cup 22, thus grounding the live wire 37 through the steering tube 10 and completing the horn circuit. The inherent resiliency of the rubber button 30 raises the switch member 35 after it is depressed and, therefore, does away with the usual separating spring.

In assembling the parts so far described, the wheel spider 13 is first bolted by the bolts 14 to the flange 12 of the hub member 11 which is permanently fixed to the tube 10. The cup 22 and cover 20 are then set over the central portion of the spider and secured in place by the two screws 23. The wire 37 of the proper length is first secured to the contact member 35 by means of the ear 36 being bent therearound and soldered thereto. Member 35 is then attached to the rubber horn button 30 by forcing the flexible rubber button-shaped lug 33 into the aperture 34 in the member 35 until the aperture reaches the reduced neck portion of said lug. The lower end of wire 37 which is free is then inserted through the round holes 26 in the cup 22 and cover 20 and down into the interior of tube 10. The horn button 30 with switch member 35 attached thereto, is then inserted in place in the retaining cup 22, thus concealing the screws 23 and the holes 26 and giving a finished appearance to the central portion of the wheel.

The instrument board bearing and horn circuit contact ring will now be described. The steering tube 10 is supported adjacent the instrument board 50 in a rubber bearing 51. The sleeve portion 52 of this bearing is of hard rubber compounded with graphite, thus giving an anti-friction wearing surface upon which tube 10 rotates. The flange portion 53 of this bearing is of soft rubber and preferably has a series of holes 54 molded therein to increase the yieldability of said flange portion 53. The bearing 51 is supported by having the soft rubber flange 53 enclosed in a metal housing 55 which is suitably rigidly secured to the instrument board 50. In Fig. 1 of the drawings, the housing 55 comprises a sheet metal stamping 60 in which the bearing 51 snugly fits and is clamped therein by the annulus 56 retained in place by the ears 57 which are bent therearound. That part of the instrument board 50 where the steering tube 10 passes, is itself shaped as shown at 58 in Fig. 1 to form part of the metal housing which encloses the soft rubber flange 53. Since the housing 55 encloses only the soft rubber flange 53 and is spaced from the hard rubber sleeve 52, as clearly shown in Fig. 1, the rigid sleeve portion 52 will be somewhat yieldably held in position. This will prevent binding of the sleeve 52 on the tube 10 during the ordinary weaving of the car body. This invention, therefore, permits an unhoused steering shaft to be supported by a bearing at the instrument board and eliminates the binding at this bearing due to distortion of the car body.

The rubber bearing 51 preferably has the electric contact ring 70 secured thereto by being molded in place in the rubber. The spring contact brush 71 is supported upon the tube 10 by a clamping ring 72 which is insulated from tube 10 by the insulating sleeve 74. The lower end of wire 37 extends through hole 75 in the steering tube and the uninsulated end of wire 37 is clamped in contact with the upturned end 73 of contact brush 71 by the clamping ring 72. It will now be clear that when the tube 10 is rotated for steering the car, the wire 37 and brush contact 71 will rotate therewith but will maintain electric connection with the stationary contact ring 70. This ring 70 has a connector terminal 76 with which wire 77 is connected. Wire 77 leads from the ungrounded side of the electric horn. It is now clear that when the horn button is depressed and grounds the insulated contact 35 upon the cup 22, that the horn circuit will be completed. It will be noted that the rubber bearing 51 also serves as an insulating mounting for contact ring 70, thereby rendering unnecessary any other insulation therefor. The entire construction is rendered more economical to manufacture by having substantially all the parts made of pressed metal.

While the form of embodiment of the present invention as herein disclosed, constitutes a preferred form, it is to be understood that other forms might be adopted, all coming within the scope of the claims which follow.

What is claimed is as follows:

1. In a steering mechanism for automotive vehicles and the like, in combination, a tubular steering shaft, having an open upper end, a steering wheel mounted upon said shaft and having a central aperture registering with the interior of said tubular shaft, a flexible rubber cap mounted upon the central portion of said wheel and covering the central aperture therein, a movable electric switch member secured to said rubber cap and supported and electrically insulated thereby, and an electric conductor leading up through said tubular shaft and through said central aperture in the wheel and having its upper end attached to and supported by said switch member, said rubber cap being depressible to ground said switch member attached thereto with another portion of said wheel.

2. In a steering mechanism for automotive vehicles and the like, in combination, a tubular steering shaft, a steering wheel mounted upon said shaft, and having a central aperture registering with said tubular shaft, a flexible rubber member mounted upon the top of said wheel at the central portion thereof having a depending interior projection, a movable electric switch contact mounted upon said projection and insulated by said rubber member and movable therewith, an insulated electric conductor leading up through said tubular shaft and said aperture and attached to and supported by said switch member, and a relatively stationary contact located adjacent said movable switch member and contacting therewith upon depression of said flexible rubber member.

In testimony whereof I hereto affix my signature.

HARVEY D. GEYER.